J. J. ALAIMO.
AUTOMOBILE SIGNAL DEVICE.
APPLICATION FILED NOV. 27, 1916.

1,276,473.

Patented Aug. 20, 1918.
2 SHEETS—SHEET 1.

WITNESSES:
Robt. D. Pearson.
Wm M. Sublette

INVENTOR.
JOSEPH J. ALAIMO.
BY
F. C. Bates
ATTORNEY.

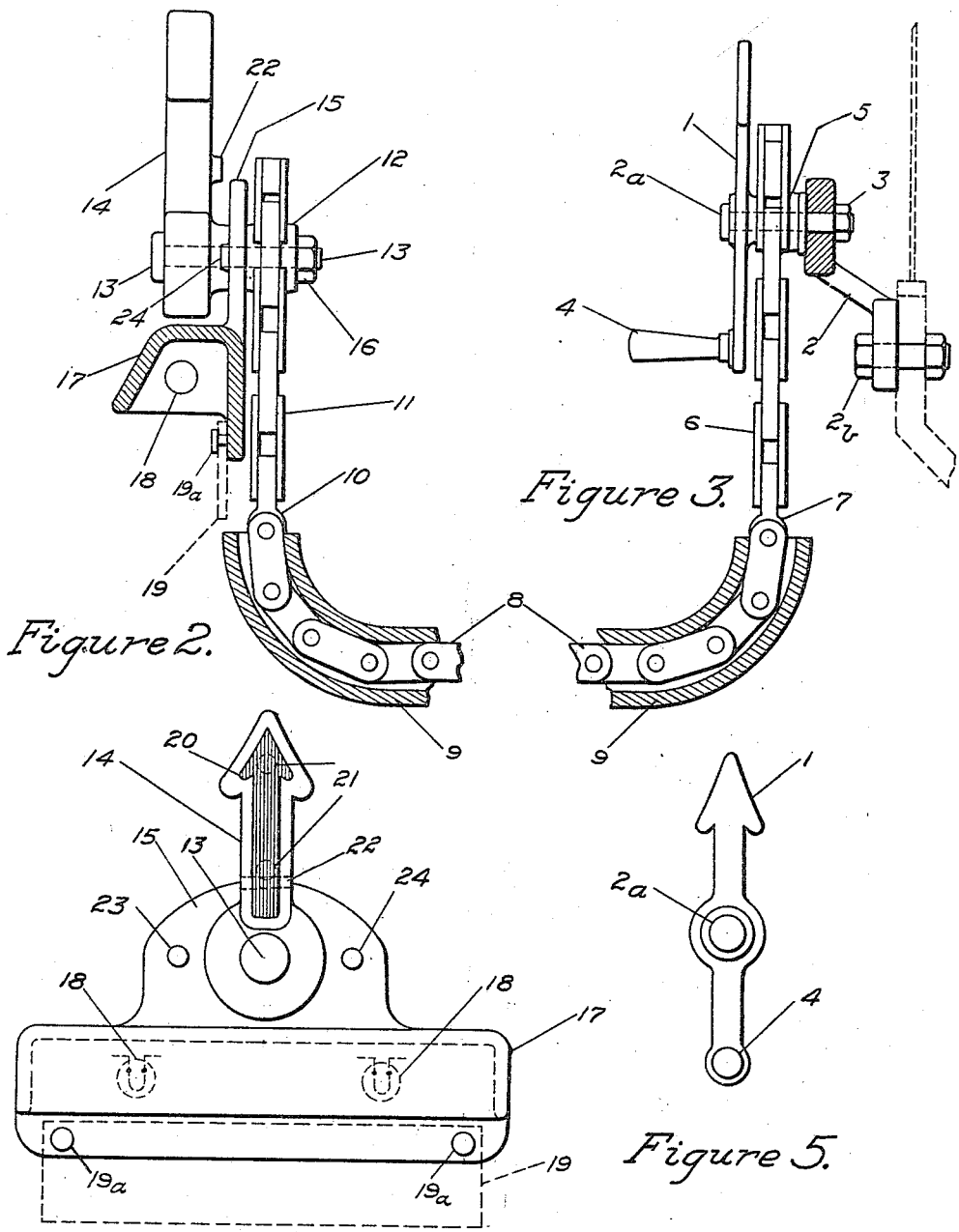

UNITED STATES PATENT OFFICE.

JOSEPH J. ALAIMO, OF SAN JOSE, CALIFORNIA.

AUTOMOBILE-SIGNAL DEVICE.

1,276,473.

Specification of Letters Patent.

Patented Aug. 20, 1918.

Application filed November 27, 1916. Serial No. 133,729.

*To all whom it may concern:*

Be it known that I, JOSEPH J. ALAIMO, a citizen of the United States, residing at San Jose, in the county of Santa Clara and State of California, have invented certain new and useful Improvements in Automobile-Signal Devices, of which the following is a specification.

My invention relates to an improvement in an automobile signal device, and the objects of my invention are:

First, to provide an automobile signal device that is operated by hand at the will of the operator.

Second, to provide a hand operated automobile signal device that can be seen night or day, from the front or rear of the automobile showing that the leading automobile is either going to turn to the right, or to the left, as the case may be.

Third, to provide a hand operated automobile signal device that will operate the front and rear signal thereof at the same time, and denote from the front and rear the direction that the automobile is about to take.

A still further object of my invention is generally to improve this class of automobile signals so as to increase their utility, durability and efficiency.

Further objects and advantages will appear in the following description, it being understood that various changes in form, proportions and minor details of construction may be resorted to within the scope of the appended claim.

For a full understanding of the invention and the merits thereof, reference is to be had to the following description and accompanying drawings, in which:

Fig. 2 is a side elevation in part section of the rear portion of my automobile signal device showing operating parts thereof.

Fig. 3 is a side elevation of front control in part section of the rear portion of my signal device showing operating parts thereof.

Fig. 4 is a front elevation of the rear portion of my signal device.

Fig. 5 is a plan view of the operating means of my signal device.

Corresponding and like parts are referred to in the following description and indicated in all the views of the drawings by the same reference numbers.

Figure 1:
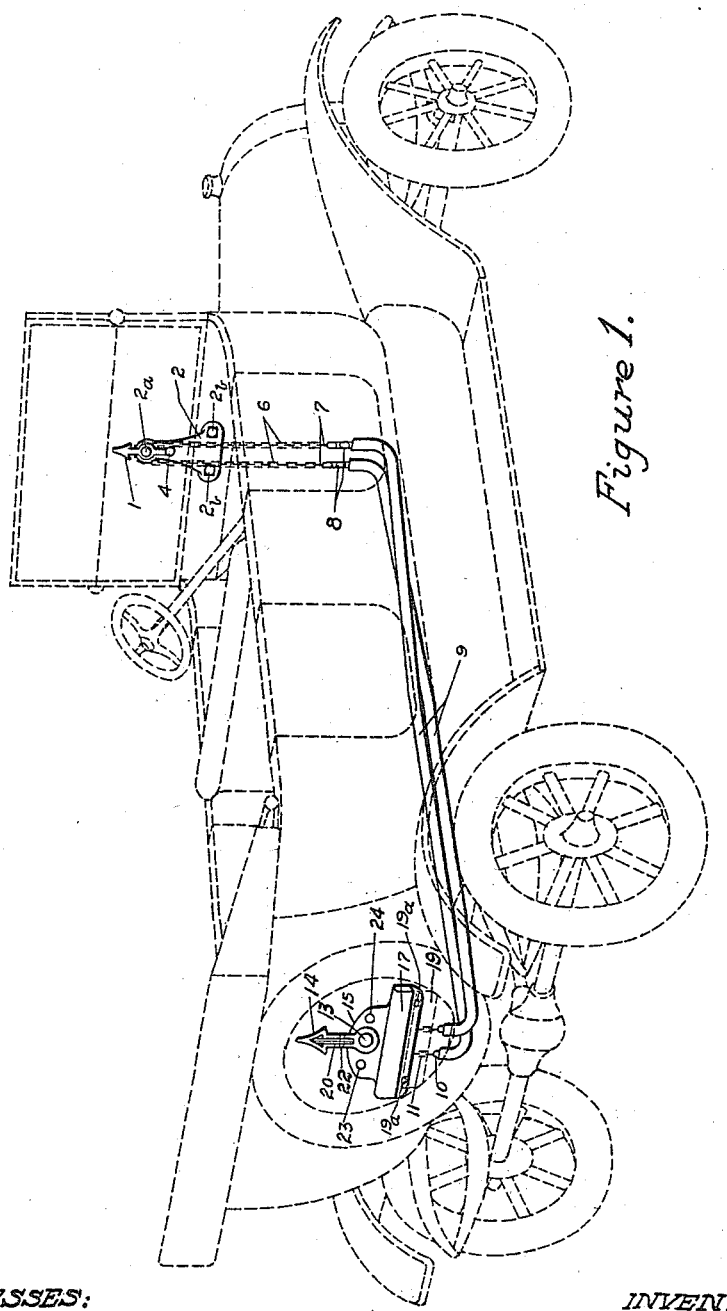
Figure 1 is a perspective view of my automobile signal device in place.

My improved automobile signal device forming the subject mater of the present invention comprises signal arms 1 and 14, said signal arm 1 being connected to a support 2 by shaft $2^a$ and held in place on said shaft $2^a$ by nut 3, said support 2 being held in place on the dash board of an automobile by bolts $2^b$; signal arms 1 and 14 being operated by crank handle 4 connected to signal arm 1. Connected to signal arm 1 is sprocket wheel 5; meshing with sprocket wheel 5 is sprocket chain 6; connecting with said sprocket chain 6 is coupling link 7, coupling link 7 connecting with sprocket chain 8, sprocket chain 8 passing through guide pipes 9, guide pipes 9 passing under automobile frame and fastened thereto in any suitable manner. Said sprocket chain 8 connects with coupling link 10, coupling link 10 connects with sprocket chain 11, sprocket chain 11 engages with sprocket wheel 12, sprocket wheel 12 being fastened to shaft 13, rear signal arm 14 being fastened to the outer end of shaft 13, shaft 13 passing through metal plate 15, and is turnable therein, and held in place by nut 16, metal plate 15 being fastened to the rear end of an automobile in any suitable manner. The metal plate 15 has at its lower end a reflector 17, adapted to reflect light from incandescent lamps 18 to a number plate 19, at the lower end thereof fastened to metal plate 15 by bolts $19^a$.

Signal 14 has a red glass front 20 containing two small incandescent lamps 21, adapted to light when electric contact 22 is brought into contact with electric connection 23 or 24 as the case may be either to the right or left.

The operation of my automobile signal device is as follows: When crank handle 4 is in the normal position and from there when turned to the left one-fourth around it brings the signals pointing to the right front and rear; when crank handle 4 is in the normal position and from there when turned one-fourth around to the right it brings the signals pointing to the left front and rear; after the turn has been made the signal is brought to its normal position ready to designate the next turn to be made.

Having thus described my invention, what I claim as new and desire to secure by Letters Patent, is:

In an automobile signal device, a metal reflector, a metal plate, said metal reflector being fastened to the lower end of the metal plate, said metal plate being provided with openings through the plate below said reflector, adapted to receive bolts therethrough for fastening a number plate thereto; a shaft journaled in the metal plate above said reflector, said shaft having a sprocket wheel attached thereto, adapted to engage a sprocket chain whereby the shaft may be turned; a hollow signal arm, said hollow signal arm being secured to the shaft, and turnable therewith; a red glass front positioned in said signal arm; said signal arm having means for attaching a light therein.

In testimony whereof, I affix my signature in the presence of two subscribing witnesses, this 21st day of November, 1916.

JOSEPH J. ALAIMO.

Witnesses:
C. E. LEWIS,
JOHN W. SULLIVAN.